United States Patent
Homayoun et al.

(10) Patent No.: US 10,430,618 B2
(45) Date of Patent: Oct. 1, 2019

(54) VANISHABLE LOGIC TO ENHANCE CIRCUIT SECURITY

(71) Applicant: George Mason University, Fairfax, VA (US)

(72) Inventors: Houman Homayoun, Vienna, VA (US); Hamid Mahmoodi, Milpitas, CA (US)

(73) Assignee: GEORGE MASON UNIVERSITY, Fairfax, VA (US)

( * ) Notice: Subject to any disclaimer, the term of this patent is extended or adjusted under 35 U.S.C. 154(b) by 0 days.

(21) Appl. No.: 15/290,871

(22) Filed: Oct. 11, 2016

(65) Prior Publication Data

US 2017/0103236 A1  Apr. 13, 2017

Related U.S. Application Data

(60) Provisional application No. 62/239,570, filed on Oct. 9, 2015.

(51) Int. Cl.
- G06F 17/50 (2006.01)
- G06F 21/87 (2013.01)
- G06F 21/76 (2013.01)

(52) U.S. Cl.
CPC ............ *G06F 21/87* (2013.01); *G06F 17/505* (2013.01); *G06F 21/76* (2013.01); *G06F 2217/06* (2013.01)

(58) Field of Classification Search
CPC .......... G06F 21/55; G06F 21/57; G06F 21/76; G06F 17/5045; G06F 17/5054; G06F 17/5068; G06F 17/5072; G06F 17/5081; G06F 21/78; G06F 21/87

USPC ................................. 716/116–119, 101, 104
See application file for complete search history.

(56) References Cited

U.S. PATENT DOCUMENTS

| | | | | |
|---|---|---|---|---|
| 7,623,378 B1* | 11/2009 | Wahlstrom | ............. | G11C 16/22 365/185.04 |
| 2002/0141232 A1* | 10/2002 | Saito | ....................... | G11C 11/15 365/158 |
| 2003/0122578 A1* | 7/2003 | Masui | ..................... | G06F 21/76 326/39 |
| 2004/0047204 A1* | 3/2004 | Hung | ..................... | G11C 11/16 365/202 |
| 2009/0060197 A1* | 3/2009 | Taylor | ................... | H04L 9/0618 380/277 |
| 2010/0038625 A1* | 2/2010 | Bertin | .................... | B82Y 10/00 257/9 |
| 2010/0281273 A1* | 11/2010 | Lee | ......................... | G06F 21/72 713/190 |
| 2011/0145934 A1* | 6/2011 | Abramovici | ............ | G06F 21/76 726/30 |

(Continued)

*Primary Examiner* — Paul Dinh

(74) *Attorney, Agent, or Firm* — Ballard Spahr LLP

(57) ABSTRACT

Provided are methods, systems, devices of a security-driven design method. The present methods and systems can enable integration of security requirements in the early stages of design along with other design constrains so that potential attacks during IC development, usage, and retirement would render ineffectual. Example methods and systems can comprise circuits and circuit design using vanishable logic through a novel hybrid design method. An example method or system can comprise vanishable logic based on hardware re-configuration and transformation by employing non-volatile memory cells.

20 Claims, 11 Drawing Sheets

(56) References Cited

U.S. PATENT DOCUMENTS

| | | | |
|---|---|---|---|
| 2011/0154062 A1* | 6/2011 | Whelihan | G06F 21/75 713/193 |
| 2011/0216573 A1* | 9/2011 | Abe | G11C 11/21 365/148 |
| 2013/0042081 A1* | 2/2013 | Park | H01L 43/08 711/154 |
| 2013/0208536 A1* | 8/2013 | Allenspach | B82Y 10/00 365/158 |
| 2014/0035617 A1* | 2/2014 | Raychowdhury | G11C 11/16 326/39 |

* cited by examiner

| GATE | METRIC | MTJ BASED LUT | MTJ LESS LUT | MIN TREE LUT | STATIC CMOS |
|---|---|---|---|---|---|
| NAND2 | DELAY | 6.46 | 5.19 | 4.69 | 1 |
|  | ACTIVE POWER($\alpha$=10%) | 90.35 | 51.65 | 51.9 | 1 |
|  | ACTIVE POWER($\alpha$=30%) | 30.12 | 17.22 | 17.3 | 1 |
|  | STANDBY POWER | 0.48 | 0.45 | 0.45 | 1 |
|  | ENERGY PER SWITCHING | 58.36 | 26.8 | 24.34 | 1 |
| NAND4 | DELAY | 4.49 | 2.99 | 2.61 | 1 |
|  | ACTIVE POWER($\alpha$=10%) | 76.73 | 43.86 | 43.71 | 1 |
|  | ACTIVE POWER($\alpha$=30%) | 25.57 | 14.62 | 14.57 | 1 |
|  | STANDBY POWER | 0.96 | 0.86 | 0.83 | 1 |
|  | ENERGY PER SWITCHING | 34.45 | 13.11 | 11.4 | 1 |
| NOR2 | DELAY | 2.49 | 1.50 | 1.40 | 1 |
|  | ACTIVE POWER($\alpha$=10%) | 80.2 | 53.35 | 53.15 | 1 |
|  | ACTIVE POWER($\alpha$=30%) | 26.73 | 17.78 | 17.71 | 1 |
|  | STANDBY POWER | 0.51 | 0.48 | 0.48 | 1 |
|  | ENERGY PER SWITCHING | 38.89 | 20.59 | 18.7 | 1 |
| NOR4 | DELAY | 3.06 | 2.01 | 1.77 | 1 |
|  | ACTIVE POWER($\alpha$=10%) | 24.25 | 13.98 | 14.18 | 1 |
|  | ACTIVE POWER($\alpha$=30%) | 8.08 | 4.66 | 4.72 | 1 |
|  | STANDBY POWER | 1.06 | 0.95 | 0.93 | 1 |
|  | ENERGY PER SWITCHING | 7.42 | 2.8 | 2.5 | 1 |
| XOR2 | DELAY | 1.51 | 0.90 | 0.84 | 1 |
|  | ACTIVE POWER($\alpha$=10%) | 22.45 | 17.45 | 17.5 | 1 |
|  | ACTIVE POWER($\alpha$=30%) | 7.48 | 5.81 | 5.83 | 1 |
|  | STANDBY POWER | 0.13 | 0.12 | 0.12 | 1 |
|  | ENERGY PER SWITCHING | 11.11 | 7.03 | 6.8 | 1 |
| XOR4 | DELAY | 4.18 | 3.17 | 2.95 | 1 |
|  | ACTIVE POWER($\alpha$=10%) | 90.06 | 73.25 | 71.18 | 1 |
|  | ACTIVE POWER($\alpha$=30%) | 30.02 | 24.41 | 23.72 | 1 |
|  | STANDBY POWER | 0.04 | 0.04 | 0.04 | 1 |
|  | ENERGY PER SWITCHING | 37.64 | 23.22 | 21 | 1 |

FIG. 8

| METRIC | MTJ-BASED LUT | MTJ-LESS LUT | MIN-TREE LUT | STATIC CMOS |
|---|---|---|---|---|
| DELAY | 2.84 | 2.13 | 0.86 | 1.00 |
| ACTIVE POWER | 5.2 | 4.25 | 3.87 | 1.00 |
| STANDBY POWER | 0.17 | 0.15 | 0.14 | 1.00 |
| PDP | 14.77 | 9.05 | 3.33 | 1.00 |
| AREA | 3.89 | 3.89 | 1.67 | 1.00 |
| DELAY SENSITIVITY TO Vth VARIATION | 1.16 | 1.22 | 1.32 | 1.00 |

FIG. 9

| A | B | C | D | E | Z |
|---|---|---|---|---|---|
| 0 | 0 | 0 | 1 | 1 | 0 |
| 0 | 0 | 1 | 1 | 1 | 0 |
| 0 | 1 | 0 | 1 | 1 | 0 |
| 0 | 1 | 1 | 1 | 0 | 0 |
| 1 | 0 | 0 | 0 | 1 | 0 |
| 1 | 0 | 1 | 0 | 1 | 0 |
| 1 | 1 | 0 | 0 | 1 | 0 |
| 1 | 1 | 1 | 0 | 0 | 1 |

FIG. 10

| A | B | C | D | E | Z |
|---|---|---|---|---|---|
| 0 | 0 | 0 | 1 | ? | 0 |
| 0 | 0 | 1 | 1 | ? | 0 |
| 0 | 1 | 0 | 1 | ? | 0 |
| 0 | 1 | 1 | 1 | ? | 0 |
| 1 | 0 | 0 | 0 | ? | 0 |
| 1 | 0 | 1 | 0 | ? | 0 |
| 1 | 1 | 0 | 0 | ? | 0 |
| 1 | 1 | 1 | 0 | ? | 1 |

FIG. 11

| A | Z | C | D | E | $Z^+$ |
|---|---|---|---|---|---|
| 0 | 0 | 0 | 1 | ? | 0 |
| 0 | 0 | 1 | 1 | ? | 0 |
| 1 | 0 | 0 | 0 | ? | 0 |
| 1 | 0 | 1 | 0 | ? | 0 |

FIG. 12

VANISHABLE LOGIC TO ENHANCE CIRCUIT SECURITY

BACKGROUND

Integrated Circuits (ICs) are at the core of any modern computing system deployed in various industry sectors such as financial, pharmaceuticals, IT, automotive, smart electric power grids, aerospace and defense, and consumer electronics, and security and trustworthiness of ICs ground the security of the entire system. Notwithstanding the central impact of ICs security and trustworthiness, a globalized, horizontal semiconductor business that involves many steps performed at multiple locations by different providers and integrates various Intellectual Properties (IPs) from several vendors has become prevalent due to confluence of increasingly complex supply chains, time-to-market delivery, and cost pressures This trend poses significant challenges to hardware security assurance in various forms. At the design stage, there is a chance of IP piracy and tampering with IP to change its intended functionality. Outsourcing design manufacturing in the interest of economy provides significant opportunities for untrusted foundries for design tampering, overproducing, and cloning. Even after releasing design to the market, the design can be subject to non-invasive reserve engineering, such as side-channel attacks, to obtain secret information during design operation or invasive reserve engineering to obtain detailed design implementation. ICs may experience counterfeiting attacks even after being resigned in the forms of recycling and remarking ICs as well as forging their documentation and selling defective ones.

SUMMARY

It is to be understood that both the following general description and the following detailed description are exemplary and explanatory only and are not restrictive, as claimed. Provided are methods, systems, devices of a security-driven design method. The present methods and systems can enable integration of security requirements in the early stages of design along with other design constrains so that potential attacks during IC development, usage, and retirement would render ineffectual. The present methods and systems can comprise circuits and circuit design using vanishable logic through a novel hybrid design method. An example method or system can comprise vanishable logic based on hardware re-configuration and transformation by employing a non-volatile embedded memory, such as Spin Transfer Torque Magnetic technology (also called STT technology), embedded flash, eFUSe, and/or the like. The non-volatile embedded memory can be used to build logic components, such as logic components for Look-Up-Tables (LUTs). The non-volatile embedded memory (e.g., STT-LUT) can be a reconfigurable design.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 8 is a table comparing circuit style alternatives;

FIG. 9 is a table comparing 3-bit adder results in alternatives styles;

FIG. 10 is a truth table for an example first circuit;

FIG. 11 is a truth table for an example second circuit;

FIG. 12 is a truth table for an example third circuit;

DETAILED DESCRIPTION

Figure 1:
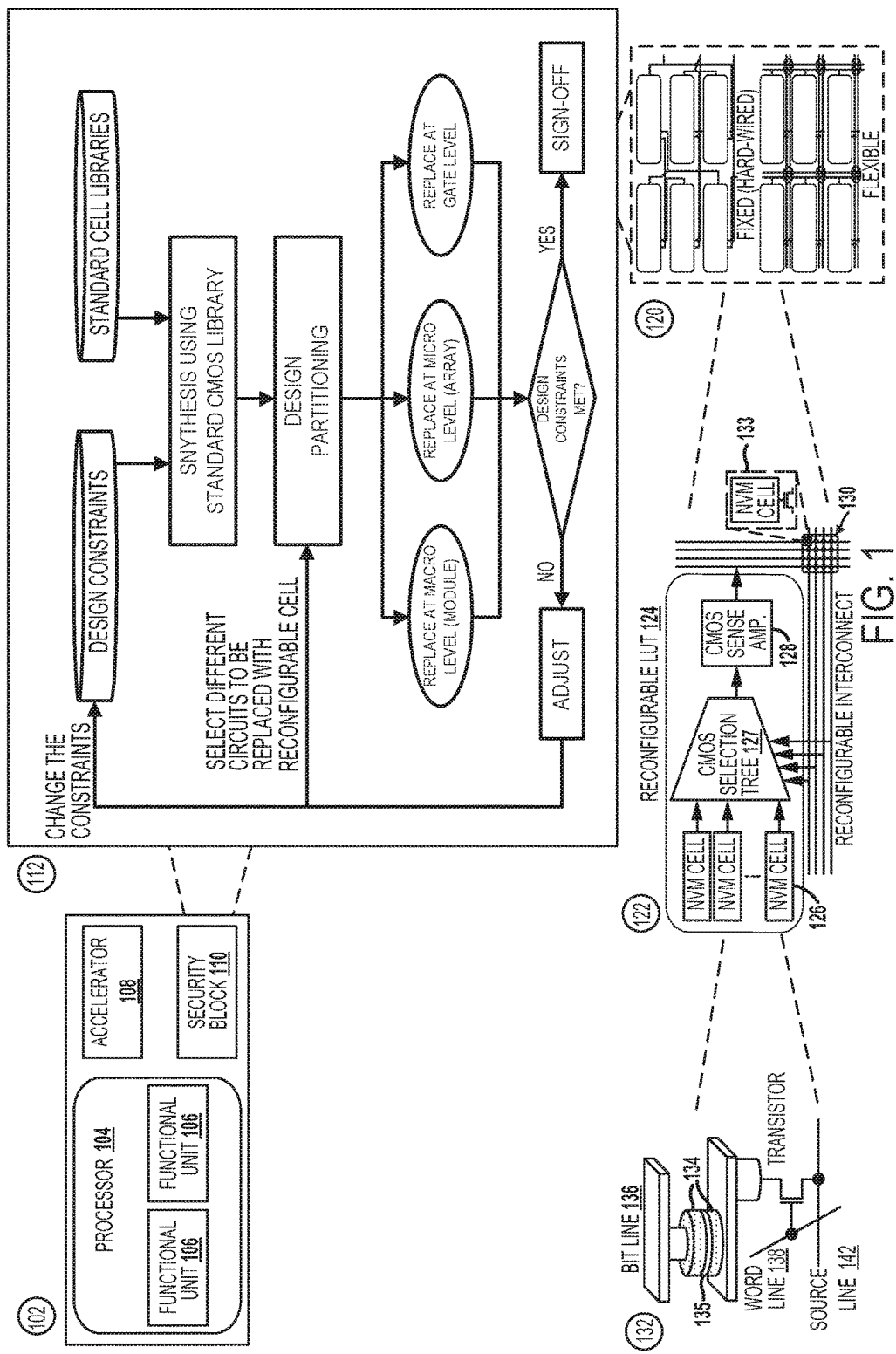
FIG. 1 is a diagram illustrating an example design method for reconfigurable secure device.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to a new security-driven design method that enables integration of security requirements in the early stages of design along with other design constrains so that potential attacks during IC development, usage and retirement would render ineffectual. The present disclosure introduces the concept of circuit design using vanishable logic through a novel hybrid design method as shown in FIG. 1. The present disclosure proposes vanishable logic based on hardware re-configuration and transformation by employing non-volatile memory cells, such as embedded non-volatile memory cells. As a non-limiting example, non-volatile memory cells are described throughout using Spin Transfer Torque Magnetic technology (also called STT technology). It should be noted that the present methods and systems, however, can be implemented using other types of non-volatile memory cells. The STT technology can be used to build logic components, such as logic components for look-up-tables (LUTs). The STT can be a reconfigurable design. For example, STT can be used to build components similar in functionality to an field programmable gate array (FPGA) but with significantly higher speed running at GHz frequency, near zero leakage power, high thermal stability, highly integrative with complementary metal-oxide semiconductor (CMOS) and more secure against various physical attacks, and overall competitive with custom CMOS design in terms of performance and energy-efficiency.

In an aspect, STT is a fabrication technology in which information can be stored in the orientation of ferromagnetic layers, called MTJ (Magnetic Tunneling Junction). The orientation can be changed by the torque of spin-polarized current. STT can provide almost 4× higher integration density, non-volatility, near-zero leakage power, high retention time and high endurance, and easy integration with conventional CMOS. The present methods and systems exploit non-volatile embedded memory cells, such as STT technology to design logical vanishable and/or reconfigurable components. Reconfigurable components can comprise logic gates (e.g., OR, XOR, XNOR, AND, NAND gates), functional units (e.g., multiplier, adder, divider, crypto engine), a combination thereof, and/or the like. The reconfigurable components can be used in the circuit architecture to improve security, power, and performance.

While considering design constrains, such as performance and power, the present methods and systems comprise a design method that integrates non-volatile memory cell (e.g., STT based magnetic tunneling junction) and CMOS technologies such that the final design implementation is hidden from any untrusted party involved in the IC supply chain (e.g., pre IC fabrication or even post IC fabrication). For example, circuit implementation can be completed when reconfigurable memory units are programmed in the design house. As a result, the untrusted foundry would not be able to clone or overproduce the design. Furthermore, the design effectively stands destructive reverse engineering attacks and non-invasive side-channel attacks. The present methods and systems can use a mixture of fully reconfigurable design (e.g., AES) or partially reconfigurable design (e.g., for arithmetic units implementation in the processor IP) to realize design security using logical vanishability. Logical vanishability can prevent the attacker from reverse engineering the programmed IC. Logical vanishability can also allow erasing and/or hiding the design of a system in order to make the functionality of a sensitive security block in the system invasive and irreversible to potential attackers. The STT technology, for the first time, provides the amazing opportunity to amalgamate reconfigurable units and custom CMOS logic on the same die. STT's easy integration with the CMOS fabrication process gives us this opportunity to fully exploit the power of reconfigurability in CMOS based design to realize design for hardware assurance.

Figure 2:
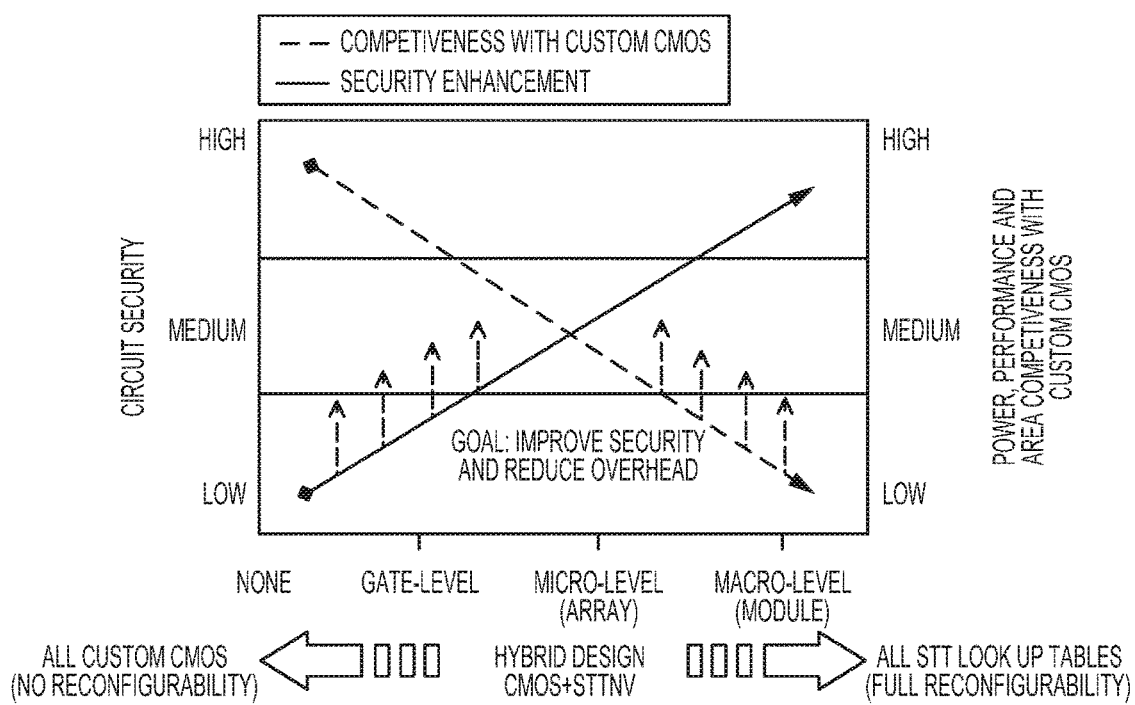
FIG. 2 is a diagram illustrating the relationship of security constraints and design constraints.

While our novel security-driven design method makes it possible to integrate both design security requirements and design parametric constrains in the early stages of design, it also enables us to analyze the impact of one parameter on others. As shown in FIG. 2, while STT-LUT brings reconfigurability to enhance security, it may adversely impact other design parameters. As illustrated in FIG. 2, while it is desirable to deploy more reconfigurable units to replace custom CMOS in a design to enhance circuit security, the impact on design constraints such as area, power, and performance increases. Therefore, there is a clear trade-off between the level of circuit security and its impact on circuit performance, power and area. The present disclosure aims to improve this trade-off by careful system (security), architectural, and circuit optimization, shown as a part of the hybrid design method in FIG. 1. The LUT-based STT designs of complex functional units with careful joint circuit-architecture optimizations can be competitive with custom CMOS designs of the functional unit, with the added advantage of bringing reconfigurability into the design and can be adapted to work as some other functionality when needed (e.g., in our case to adapt them to a different functionality than they were originally designed for, to vanish the logical functionality of the design).

In an aspect, the present methods and systems can enable the vanishable logic to become a deployable technology. The present methods and systems can comprise a basic set of logic components and mechanisms to undergird a new class of electronics defined by both their performance and reconfigurability. Due to non-volatile feature of STT technology, there may not be need to store the key encryption engine in form of programming bits in separate memory storage. In addition, the present methods and systems have the capability to be programmed, erased, and reconfigured at run-time (e.g., upon any attempts to physically open, remove, or transfer it from its host component using standard reverse-engineering techniques). Designs based on the vanishable logic technology have performance comparable to commercial permanent design while feature run-time reconfigurability that enables design reconfiguration in real-time, becoming adaptive to the operating environment.

In addition to enhancing design security, the power of reconfiguration is immense and can enhance performance and power-efficiency by many folds. In an aspect, by simply replacing a custom CMOS multiplier with a reconfigurable hybrid STT+CMOS, reconfiguring a multiplier to an adder, a significant performance improvement of up to 50% can be achieved as well as power reduction of up to 16% and maximum temperature reduction of 27° C. in standard CPU intensive applications (SPECINT2006). The present methods and systems can implement reconfigurability in the processor architecture, by using a new class of partially and fully flexible and reconfigurable units to simultaneously address power, performance, thermal, and reliability, and security challenges.

In this cross-layer method spanning technology, circuit, architecture and security layers, an example process can comprise i) designing on-die, run-time reconfigurable hybrid NVM+CMOS (e.g., STT+CMOS) units to realize logical vanishability, and develop optimization methods to make it competitive with custom CMOS design operating at GHz frequency, ii) introducing novel security metrics to represent design security requirements iii) partitioning a design to hybrid NVM+CMOS and custom CMOS partitions based on security level requirements and power/performance constraints. iv) deploying reconfigurable hybrid design at various design level ranging gate, micro, and macro levels. v) exploring full vs. partial reconfigurable STT cells and flexible (programmable) vs. fixed (hard-wired) interconnects, vi) introducing a set of properties and metrics to measure the vanishability of the design, vii) carefully analyzing the security and power/performance trade-offs as function of vanishability metrics.

The present methods and systems can comprise the design and use of on-die, run-time STT-based reconfigurable units to realize vanishable logic and enhance security of sensitive computing systems including the processor architecture and the security engine to protect against possible attacks during development, usage, and retirement. To date, the STT technology has been only used to break through the memory wall by implementing low-power, high-density on-chip memories. The present methods and systems involves the redesign of computer hardware around the non-volatile embedded memory cell (e.g., MTJ) at the various layers.

At the circuit level, the performance of the hybrid STT+CMOS units can be improved to make the units competitive with custom CMOS. The present methods and systems can comprise circuit techniques and methods to enhance the power, performance, and reduce the overhead of reconfigurable STT-LUT design to make it competitive with custom CMOS design operating at GHz frequency.

At the architecture level, a design method is used that performs partitioning of a design to hybrid STT and CMOS partitions based on security-level requirements and power/performance constraints. The design partitioning can be performed at the gate, micro, and macro levels. Reconfigurable units are exploited to improve power and performance of the system.

At the security level, reconfigurable design can be at the gate, micro, and/or macro levels based on required security level. For example, fixed and flexible reconfigurability can be used to enhance design security at the micro and macro levels. We will investigate trade-off between design parametric constraints and design security constraints.

The present disclosure comprises an architecture with at least one or more of the following features:
1. Vanishable logic as a methodology to design electrically-robust circuits protecting security sensitive parts including intellectual property (IP), classified algorithms, secret information, cryptographic keys, standing reverse-engineering and counterfeiting, and impeding design cloning and overproduction.
2. Hybrid design to realize logical vanishing by employing non-volatile embedded memory cells, such as the highly promising Spin Transfer Torque (STT) Magnetic technology (also called STT Technology), to build Look-Up-Table (LUT) based logic components from simple NAND and NOR gates to an array of gates such as complex MAC arithmetic unit, AES engine, and ultimately the entire processor.
3. A design method that performs partitioning of a design to hybrid NVM and CMOS partitions based on security level requirements and power/performance constraints. The design partitioning can be performed at the gate, micro, and macro levels. The security and power/performance trade-offs are explored via full vs. partial reconfigurable NVM cells and flexible (programmable) vs. fixed (hard-wired) interconnects.
4. Circuit techniques and methods to enhance the power, performance, and reduce the overhead of reconfigurable NVM-LUT design to make it competitive with custom CMOS design operating at GHz frequency.

5. A mapping strategy of existing designs to the new technologies for logical vanishability to find the best tradeoff between security and implementation complexity for coarse grain and fine grain reconfigurable NVM logic. For example, the present methods and systems can comprise applications and other tools for assisting an IP developer to map a hardware design to hard-wired or flexible interconnect reconfigurable NVM logic.
6. Evaluation of logical vanishing of a design make it difficult for an attacker to revers engineer its design and moreover unravel its functionality.
7. A set of properties and metrics can be used to measure the vanishability of the design. An example logical vanishing design can be evaluated to determine whether it enhances its security and make it almost impossible to reverse engineer. Security can be quantified with several metrics described herein.

Current techniques of reverse engineering have raised serious concerns in the IC design community. Reverse engineering can be done at different level of design abstraction and various phases of system on chip (SoC) design supply chain. Each of these phases are vulnerable to different type of attacks and conversely there are countermeasures to safeguard systems from malicious activities. In an aspect, the present methods and systems can be configured against attacks of interest to unravel the IP design happening after SoC fabrication and especially those against sensitive and sophisticated computing design such as the one used in financial sector, military and aerospace electronics. In this section, the state of the art in hardware security, attack prevention, and reconfigurable hardware design is reviewed, and the novelty of the present vanishable design is discussed over state-of-the-art reconfigurable designs.

The concept of absolute security becomes far from reality as a determined adversary could break any device if enough time and resources were given. An attacker attempts a range of activity from extracting the gate level netlist at foundry to extracting secret information in the field. An untrusted foundry may compromise the design security by inserting extra circuits as hardware Trojans, or extracting IPs used in a circuit and making profits by selling them without knowledge of IP owner, or overproducing the design and sell in the black market. The thread continues in the field in the forms of non-invasive and invasive attacks by degree of exploitation on hardware. Various forms of side channel analysis and fault injection are the main forms of non-invasive hardware attacks. The main aim of these attacks is to reveal secret information stored in the device, e.g. a cryptographic key. Hardware and electronics disassembly and reverse engineering are examples of invasive attacks.

Reconfigurable Hardware for Security: Embedded SoCs can be augmented with FPGA fabric to enhance security or performance of an application by mapping sensitive functionality (e.g., either performance sensitive or security sensitive) on FPGAs. An example architecture can rely on dynamic reconfiguration using SRAM FPGA to enhance the security of embedded systems by continuously monitoring the operation of the system to detect abnormal behavior and to use reconfigurable hardware to provide various levels of protection and performance. The present methods and systems can use a different approach. First, the present methods and systems can make the design disappear and irreversible. By this approach, an attacker has no chance to reconstruct the design. This approach assures the configuration memories filed with nothing but null values. This approach allows complete disappearance of the logic block in order to absolutely hide the functionality of system. Second, the present methods and systems can use the NVM look up table based design as a method to implement the hardware reconfiguration and integrate it with CMOS embedded system. In some scenarios SRAM FPGA, while provide us with reconfigurability and potentially enhance security, may not be practical to be used in embedded system where power and performance are major constraints. For example, SRAM FPGA may have large leakage power dissipation and most suited for below GHz range operating frequency. Also note that while memories such as SRAM and DRAM are volatile and potentially can provide higher level of security, they are also vulnerable against sophisticated attacks such as Cold boot attacks. In addition, FPGAs have very high reconfiguration overheads. Partial reconfiguration of Xilinx Virtex FPGA is in the order of milli-seconds. This is because, FPGA and processor are on different dies due to the difficulty of integrating the CMOS and flash-based commercial FPGA fabrication processes. Due to the high power consumption of FPGAs and the reconfiguration overhead, integrating FPGAs in embedded SoC is somewhat a challenging problem. In addition, the present method allows hybrid design by partitioning the design into reconfigurable and non-reconfigurable parts and only applying the reconfigurability to an extent that satisfies the level of required security. By not modifying the rest of the circuit, the present methods and systems attempt to make the hybrid design competitive with custom CMOS design.

Volatile Memory Security: In reconfigurable architectures the choice of memory to store data (e.g. configuration bits) can be important. Reverse engineering attacks on embedded memories shows that still it is very possible to retrieve sensitive information partially or completely. Therefore the choice of memory is vital. Some memories are more prone to compromise than the others. Volatile memory like SRAM may need power to keep the stored data (e.g. the configuration bits) at run time and this reduces the system power efficiency. From the security perspective, volatile memories are not entirely protected against attackers. A very sophisticated attacker can recover the SRAM contents in a limited window of time. Therefore, one can argue that from the security perspective volatile memories are not entirely volatile and using cold boot attacks. Compare to volatile memories such as SRAMs, nonvolatile memories like STTRAM offer a different power-performance trade-off which make them a more power efficient design for power constraint embedded applications, for instance in military or aerospace industry. The present methods and systems can utilize non-volatile STT design. Due to volatility feature, these memories are more vulnerable to physical attacks. The challenge is to make these non-volatile designs volatile. In an aspect, applying logical vanishability to the STT-NVs can make them have features similar to volatilable memories. Another question might be, why not using the conventional nonvolatile memory technologies such as ROMs? These technologies have been victim of memory remanence issue. For instance write-once memory (anti-fuse) used in FPGAs can be directly attacked by cross-sectioning analysis.

In an aspect, the present methods and systems can comprise and/or be based on a hardware attack model. The present methods and systems can comprise a vanishable design, such as techniques to realize vanishability at various design levels from the gate netlist level (fine grain) to the module and architecture level (coarse grain). A set of metrics can be used quantify design security under this new security mechanism.

Before explaining vanishability, a hardware attack model can be defined for reverse-engineering the design. An adversary can be an untrusted foundry who is given a circuit GDSII for fabrication. Although a design house may not pass circuit functionality, the untrusted foundry may overproduce the circuit or maliciously modify the circuit to reduce its reliability. An adversary can also be a person or an organization highly motivated, well-equipped, well-funded and very skillful to lunch reverse-engineering or side-channel attacks at all levels to unravel the functionality of design or to obtain secret information. The circuit given for fabrication may not support any strong prevention mechanism against design tampering or overproduction. Further, after design fabrication, the sensitive block to protect is like a black box, e.g., the logical aspect of block is unknown to the adversary. The adversary also may have access only to the external I/O ports and peripherals of the design, for monitoring, reverse engineering and ultimately hacking (to perform side channel attacks, for instance). The attacker may employ a series of reverse engineering techniques to learn about the physical and logical property of the sensitive block. Potentially the attacker might probe the external I/O pins, triggering the design to react with some inputs and get corresponding outputs. The adversary may have physical access to a pool of identical captured devices. Therefore, he can attempt to probe each captured device with varieties of inputs and monitor outputs in order to attain a group of input and output sets. Hence, the adversary may be able to make a logical relationship between input and output sets to discover the logic, functionality, and the design of the system. The attacker may have enough time and assets to learn about possibly embedded obfuscation and metering mechanisms in the system.

Logical (functional) vanishability allows for erasing and hiding the design of a system in order to hide the functionality of a sensitive security block in an embedded SoC from potential attackers and make it extremely difficult for reverse engineering. Hardware reconfiguration is a promising way to do this. However, the FPGAs are very power hungry and not applicable in embedded systems that are used in critical-mission tasks where mobility and energy efficiency is required. For example, the reconfigurability property of FPGAs may increases the effort required for reverse engineering as compared to ASICs. In addition the embedded flash memories in FPGA which hold programming bits may have security vulnerability. Therefore, an important question is: would it be a possible way to bring the reconfigurability feature of FPGAs into ASICs domain while having the benefits of low-power and high-performance design as well as hiding the reconfiguration bits? The answer is yes. To realize the reconfigurable look-up-table (LUT), STT logic design can be used.

In an aspect, LUT-based STT designs of complex functional units can be competitive with custom CMOS designs of the functional unit, with the added advantage that of bringing reconfigurability into the design and can be adapted to work as some other functionality when needed (e.g., to adapt them to a different functionality than they were originally designed for, e.g., to disappear the logical functionality of the design). In addition to security benefit of reconfiguration, the power of reconfiguration is immense and will enhance performance and power-efficiency by many folds.

The present systems and methods can comprise the design and use of on-die, run-time reconfigurable logics, array of gates, arithmetic units and function macro blocks to enhance the security of the design by reconfiguring them at run-time. To enable reconfigurability, an example architecture can implement Spin Transfer Torque (STT) technology which offers CMOS compatibility, near zero leakage power, high thermal stability and scalability.

In an aspect, metrics can be used that quantify the vanishability of a design.

Traceability: is the fraction of amount of information in LUTs left by vanishing mechanism over the total amount of design information. For example, for a logical vanishing design this is the number of recoverable LUTs over the total number of LUTs, which can be, in fact, the total number of undamaged logic over the total number of logic. This property may, in fact, show the effectiveness of the vanishing mechanism.

Restorability is the fraction of non-vanishing logics that can be restored over the total logics used in the system. An expert attacker might be able to recover some LUTs content after the vanishing procedure. Therefore, it is very important to know what percentage of the design can be recovered even after vanishing procedure.

Durability: is the time duration from employment of the vanishing mechanism until it loses vanishing capabilities. This metric explains the life span of vanishing material or re-configurable logics1. For example, one way of implementing re-configurable logic is to use LUTs. Some types of memories (e.g. Flash memory, Phase Change Memory (PCM)) suffer from wear out phenomena and may not be re-usable after sometimes Performance and Power Cost: Performance cost is the fraction of the new system throughput over the baseline non-vanishing design throughput. This shows that how employment of vanishing mechanism might impact the system's performance. The power cost can be the power difference of vanishing design compare to the baseline non-vanishing design.

Area Cost: is the fraction of the area needed to implement the vanishing design over the area needed to implement the system without vanishing capability. This metric measure the area overhead imposed on an existing system by applying the vanishing mechanism.

Time for Brute-force Attack: Assuming an attacker with high-end computing resources, the required time to determine the content of reconfigurable units should be beyond any reasonable time.

The above metrics can be used to evaluate the effectiveness of the vanishable design to enhance the security against various attacks.

In an aspect, the present methods and systems can comprise the design and use of on-die, run-time reconfigurable logic gates (e.g., NAND and NOR), arithmetic units (such as multiplier and divider) and functional macro blocks (such as AES) to enhance the security of the design. The run-time reconfiguration can be realized by look-up-table (LUT) based design, which can use highly promising new Spin Transfer Torque (STT) technology to store the LUT data. The new reconfigurable STT-LUT design not only enables run-time reconfiguration to vanish the logical property of the design, but also offers added advantage for complex blocks in terms of power, performance, lifetime reliability and thermal stability as compared to non-reconfigurable CMOS implementation.

STT can provide i) approximately 4× higher integration density than conventional Static Random Access Memory (SRAM), ii) high retention times (even more than 10 years), iii) high endurance ($10^{16}$ writes, or 10 years of operation as L1 cache), iv) near-zero leakage with close-to SRAM read performance, v) excellent thermal robustness 300° C., vi) soft error resilience, and vii) above all, STT cells are easy to integrate with the conventional Complementary Metal Oxide Semiconductor (CMOS) fabrication process. Only a few magnetic layers between the metal layers 3 and 4 of the chip need to be added. STT technology can have transformative potential to impact logic design by offering a low overhead run-time reconfigurable platform that offers not only opportunities for power and performance improvements, but also enhanced security for sensitive blocks.

STT technology (e.g., and other non-volatile memory) provides the amazing opportunity to design reconfigurable functional units that are on-die, comparable in performance to custom CMOS logic, and have low reconfiguration overhead. Existing Field Programmable Gate Arrays (FPGAs) cannot be used to design on-chip reconfigurable functional units since FPGAs are built using flash devices that do not integrate well with the conventional CMOS fabric. Moreover, the reconfiguration time is long in existing technologies. For example, typical partial reconfiguration time on Virtex 6 FPGA is in the order of tens of milliseconds. An alternative would be to use SRAM based reconfigurable functional units, but they suffer from problems of scalability, high leakage, high sensitivity to variations, and soft errors.

The reconfigurable design can be realized using STT based Look Up Tables (LUT). By loading different values in the LUTs, the reconfigurable fabric is able to perform many different functionalities, e.g. multiplication, addition, division, or even a complex AES task. LUT-based STT designs of complex logic gates and functional units can be competitive with custom CMOS designs of the functional unit, with the added advantage of bringing reconfigurability into the design and can be adapted to work as some other functionality when needed. Moreover, there is added security benefit because the content of the LUTs can be hidden to IC manufacturer or eliminated upon detection of a reverse engineering attempt. Moreover, the content of an LUT cannot be reverse engineered from its physical layout because of its generic and programmable nature.

In addition to security benefits, the power of run-time reconfiguration is immense and will enhance performance and power-efficiency by many folds. For instance, by simply reconfiguring a multiplier to an adder, a significant performance of up to 50% can be achieved as well as power reduction of up to 16% and maximum temperature reduction of 27° C. in standard CPU serial applications (SPEC2006). It is of great importance warrant to explore reconfigurability in the design, by using new class of partially and fully flexible and reconfigurable units to address security, power, performance, thermal, and reliability challenges. In an aspect, the present methods and systems can comprise at least three kinds of reconfigurable units: reconfigurable logic gates (e.g., NAND, NOR, XOR, XNOR, AND, OR), arithmetic units (e.g., multiplier, divider, adder), functional macro blocks (e.g., AES, SHA, blowfish, Rijndael), and/or the like.

While a fully reconfigurable fabric offers enhanced levels of security, simple logic circuits built using a fully programmable fabric exhibit power and performance overhead as compared to a custom CMOS implementation. In an aspect, partial reconfigurability offers significant opportunity for lowering the overhead and making the MTJ-based LUT performance comparable to or better than the custom CMOS alternative. Reconfigurability (e.g., partial or full) offers new opportunities for power and performance improvement at the architecture level that are not offered by the custom CMOS method.

In an aspect, the present methods and systems can use MTJs for reconfigurable logics and to enhance the security of the sensitive IP while making its design competitive, if not better, in terms of power and performance, compared to a non-reconfigurable CMOS. The present methods and systems can also comprise techniques that results in reducing the reconfiguration overhead.

(i) Design of LUT MTJ-based reconfigurable logics. In an aspect, MTJ-based LUTs can be used for designing reconfigurable design such as simple NAND and NOR gates, and complex MAC arithmetic unit or AES macro block. For complex units such as multiplier and divider arithmetic units, STT LUT style can be competitive with custom CMOS design in terms of power (dynamic and leakage) and area, while it is slightly slower in performance. For smaller designs the custom CMOS is still superior to reconfigurable STT style. Circuit techniques can be used and/or evaluated to make reconfigurable STT LUT design competitive with CMOS, even for simple gates.

Figure 3:
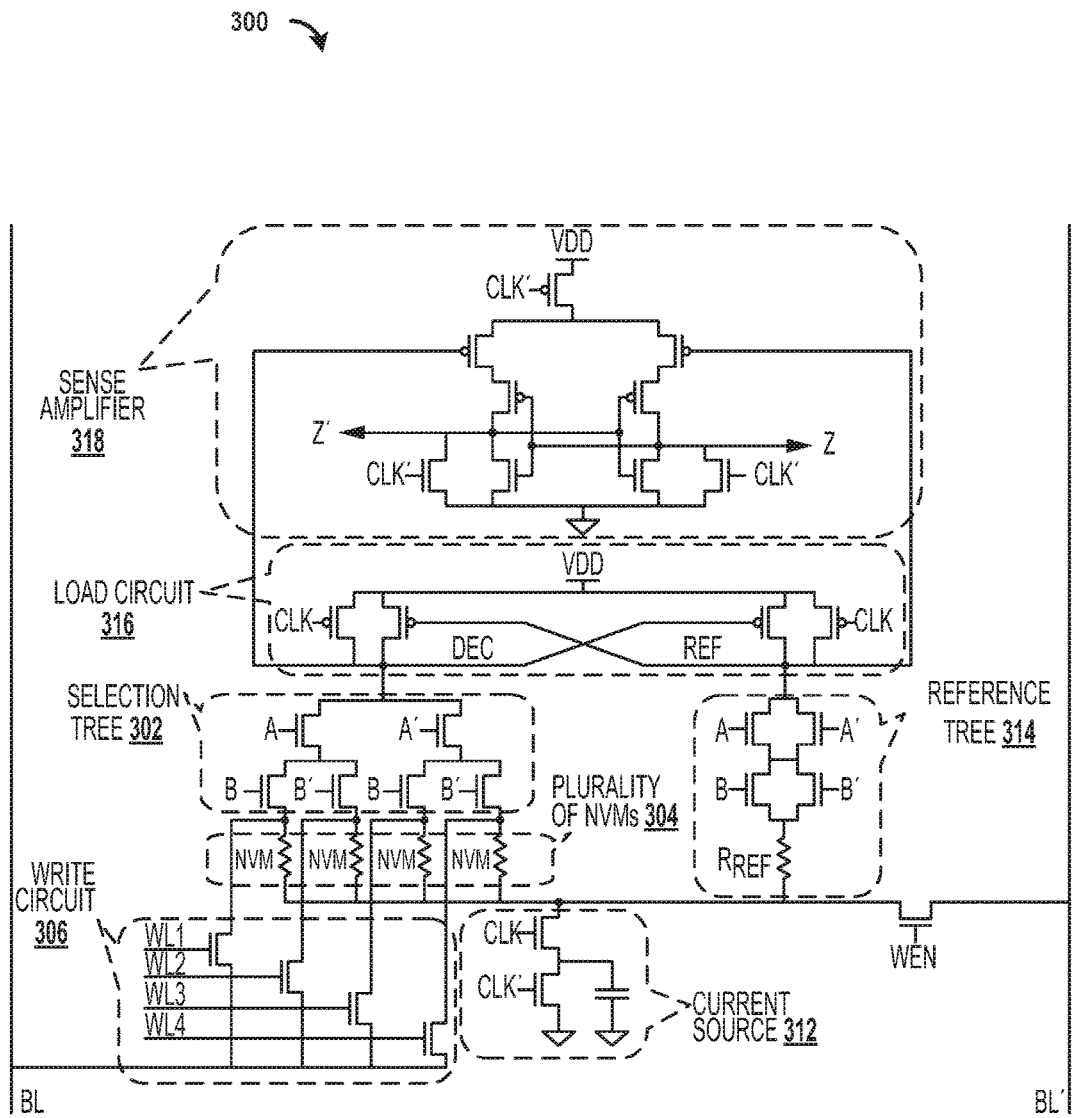
FIG. 3 is a diagram illustrating an example of a small 2-input NVM-based reconfigurable look-up-tables using 4 NVMs.

(ii) Improve power and performance by exploiting partial reconfigurability: For the partial reconfigurable units in the proposed design, the number of required functions can be limited (e.g., Adder and Multiplier functions). For these units, customization of the programmable fabric can be performed, by eliminating MTJs (e.g., or other non-volatile memory cells) that store a fixed state. An MTJ with a fixed low (high) resistance state can be replaced by a short (open) circuit (e.g., a simple example is shown in FIG. 3). Moreover, the write circuitry associated with those fixed state MTJs will be removed resulting in additional improvements. By going from full reconfigurability to zero reconfigurability (e.g., read-only) for a 5-input LUT, improvements in the normal mode delay, power, and area are 20%, 30%, and 20%, respectively. The reduction in reconfiguration overhead is more significant (more than 50% for the adder-multiplier example). However, by reducing the level of programmability, the security level may be reduced as well. Hence, this technique needs to be explored while maintaining the required level of security. Performance results for partial reconfigurable functional units can be used for high level estimations and modeling that involves considerations of both security and power/performance requirements.

(iii) Develop hybrid MTJ (e.g., or other non-volatile memory cells) design methodology for reconfigurable units. At the architecture level, the choice of the number of functions for reconfigurable units (i.e. degree of flexibility: custom, partial, and full) offers similar trade-off. Moreover, some of these design choices involve security level trade-off as well. A holistic approach can be used to the design involving all the design options at various levels of abstraction to make best use of the STT technology for the proposed system to maximize the level of security under given power and performance requirements.

(iv) Reliable design under (Process-Voltage-Temperature) PVT variations and Device Aging: MTJ (e.g., or other non-volatile memory cells) process variation data and models can be used along with the CMOS transistor variations and aging (e.g., NBTI) to evaluate life-time reliability of the MTJ-based LUT circuits. A sensitivity based analysis can be applied on the MTJ-based LUT circuits to identify most critical transistors for reliability enhancement, and then explore a statistical design methodology for optimally sizing those transistors. Both die-to-die and inter-die variations can be used to design robust LUT circuits. Moreover, utilizing reconfiguration capability of functional units to cope with variations and aging can be explored. Reconfigurability allows for bypassing of faulty units. At the circuit level, the present methods and systems can comprise an optimal placement of redundant LUTs for replacing LUTs that are diagnosed to be faulty during testing or run-time. Device aging can be another challenge faced in nano-scale. The transistor aging mechanisms are several kinds all resulting increase in threshold voltage or gate leakage of a transistor over time and hence degrading circuit performance. Since the aging process is temperature and voltage stress dependent, asymmetric aging of transistors in symmetric designs such as memory cells or sense amplifiers used in LUTs may also lead to functional failures. Impact of device aging on STT-LUT circuits can be analyzed and example architectures can be used to minimize the impact.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

FIG. 8 shows initial simulation results of the various STT and customs CMOS circuit styles for logic gates of various complexity implemented in a predictive 32 nm technology. All the results are normalized to the corresponding results for static CMOS implementations. It is clear from the results that for small logic gates, the STT-LUT style shows considerable overhead as compared to the custom CMOS implementation; however, as the circuit complexity increase this overhead reduces. We also did a cases study of an integer adder and multiplier for which the results are shown in FIG. 9. The result indicates even less power and performance overhead associated with the STT-LUT implementation. STT-LUT is far better than the conventional CMOS LUT in all respects. It is anticipated that as the complexity of the functional unit increases, the overhead of STT-LUT implementation reduces, making it more competitive with the custom CMOS implementation. For very complex functions such as floating point units the STT-LUT style will outperform the custom CMOS implementation. That is due to the ability to collapse multiple stages of logic into a single high fan-in LUT that exhibits better performance than a cascade of lower fan-in CMOS gates. Another observation from FIG. 9 is that the LUT style shows less power overhead for higher data activity ($\alpha$). This is due to the dynamic nature of the STT-LUT style that increases its switching activity making it a better fit for high data activity applications. Such observations at the circuit level will be used to make proper design decisions at the architecture level.

Integrated Circuits (ICs) or chips are at the core of any modern computing system such as military systems and smart electric power grids, and their security and trustworthiness ground the security of entire system. Notwithstanding the central impact of ICs security and trustworthiness, the horizontal IC supply chain has become prevalent due to confluence of increasingly complex supply chains and cost pressures. This trend poses significant challenges to hardware security assurance including design cloning, overproduction and reverse engineering. In possession of detailed design implementation at the physical level, an untrusted foundry may overproduce the design without design-house permission. After releasing a design to the market, it can also be subject to non-invasive reserve engineering, such as side-channel attacks, to obtain secret information during design operation or invasive reserve engineering to obtain detailed design implementation.

In order to prevent design cloning and overproduction, impede circuit reverse engineering and counterfeiting, and protect confidential data and proprietary/classified intellectual property, the present methods and systems can comprise a novel security-driven design method to realize design for assurance at a wide extent from gate level, to micro level (array), and to macro level (module). With considering design constraints, such as performance and power, our method integrates STT and CMOS technologies such that the final design implementation is hidden from any untrusted party been involved in the IC supply chain. Design implementation is complete when reconfigurable SST units are programmed in the design house. As a result, the untrusted foundry would not be able to clone or overproduce the design. Furthermore, the design effectively stands destructive reverse engineering attacks and non-invasive side-channel attacks.

(i) Security Metrics: Similar to design parametric constrains such as power and performance, low-level security constraints can be defined according to design security requirements to minimize design vulnerability and ensure its resiliency against attacks. Security constrains can be expressed in terms of security metrics whose satisfaction indicates meeting design security requirements. Therefore, novel security metrics can be defined to represent design security requirements. Addressing design security requirements may contradict design parametric requirements. Hence, trade-off between design parametric constrains and design security constrains can be accounted for.

Figure 4:
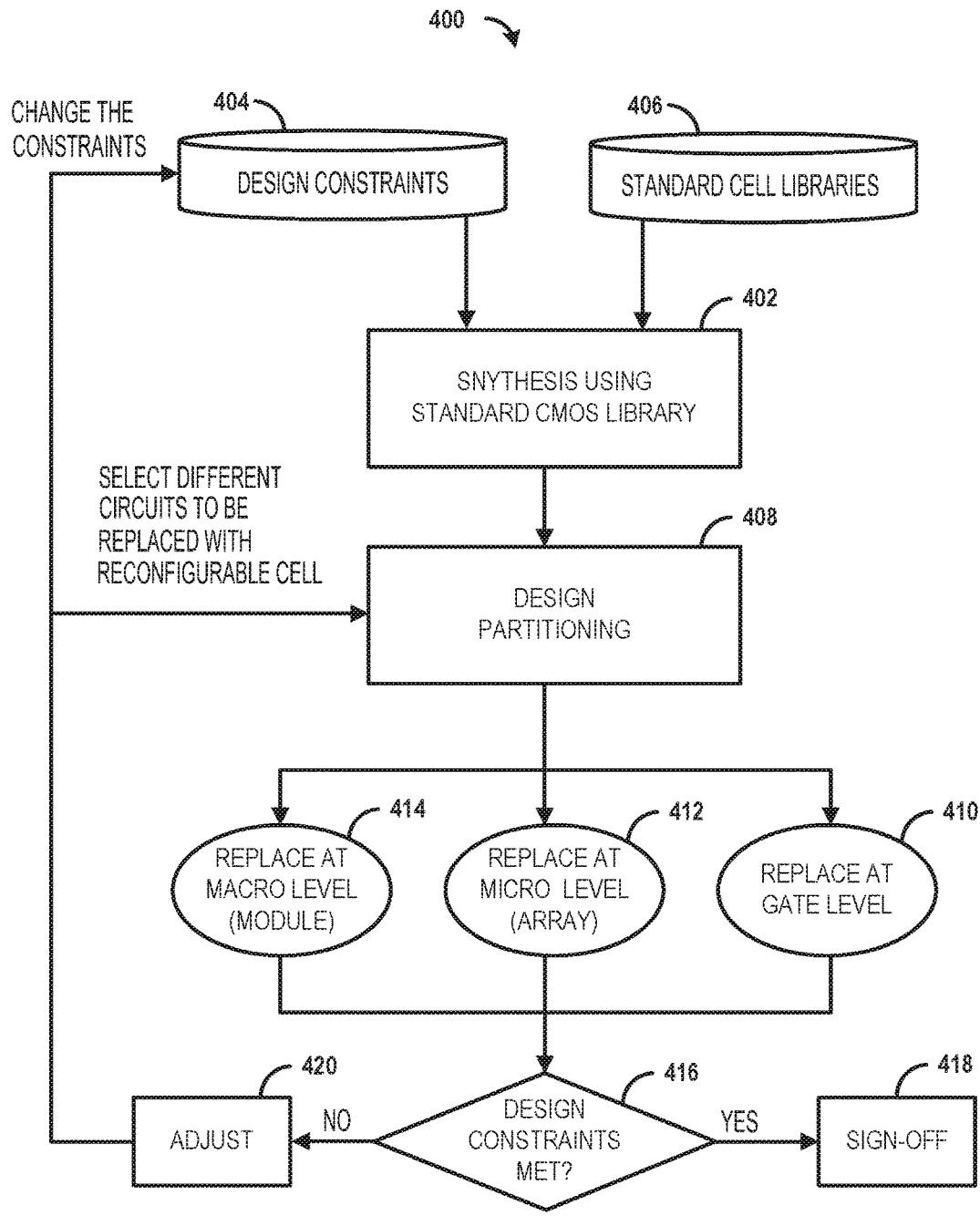
FIG. 4 is a diagram illustrating an example security-driven NVM-CMOS design method.

(ii) Security-Driven Design method: FIG. 4 presents our novel inceptive security-driven design method. As design security is being considered the primary goal, this necessitates initial design preparation by identifying design functional requirements and determining their security sensitivity. The design for reconfigurability can be implemented to determine which parts of a design need to be implemented using reconfigurable STT units and which parts using custom CMOS cells. After determining required security level for design partitions, reconfigurable units are inserted into the design. At the gate level, the cells can be chosen such that it makes impossible for the untrusted foundry to determine cells functionality in the length of any reasonable time. At the micro level (array), groups of standard cells are realized using one or more reconfigurable units. While this would significantly enhance design security, it ensures that design parameters stay in acceptable ranges. At the macro level (module), the entire of a security sensitivity block is implemented using reconfigurable units. In the next step of design method, the regular design method including placement and routing would be followed. While design security constrains are addressed in the earlier step, meeting design parametric constrains are of the goals of the regular design method. If all design parametric constrains are met at the end, the design is sign-off for fabrication. Otherwise, design constrains are adjusted and reconfigurable unit placement and the regular design method are repeated until all design security and parametric constrains are satisfied.

The novel security-driven design method introduces design security requirements in the form of security constrains similar to other design constraints such as power and performance constrains. As a result, design security requirements would be considered during design development contrary to the current design practice where design security is an afterthought. The security-driven design method ensures that the signed-off design would be resistance against variety of security attacks such as revers-engineering or overproduction, meanwhile design parametric constrains are met.

(iii) Design Security at Different Levels: Design security for each design part or function can be implemented at different levels depending on its security sensitivity and attack models. Security can be realized at three different levels: gate level, micro level (array), and macro level (module). At the gate level, a procedure for select and replace custom CMOS cells with reconfigurable units can be used such that the procedure prevents attacks such as reverse engineering and overproduction while minimizing the influence of reconfigurable units on design parameters. Metrics can be used to identify the best candidates for replacement such that determining their functionality stays beyond any reasonable time.

Figure 5:
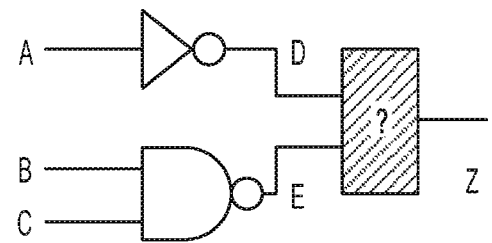
FIG. 5 is a diagram illustrating an example circuit.
Figure 6:
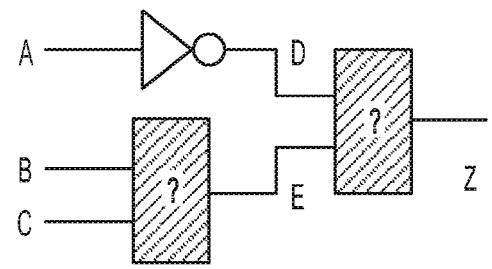
FIG. 6 is a diagram illustrating another example circuit.
Figure 7:
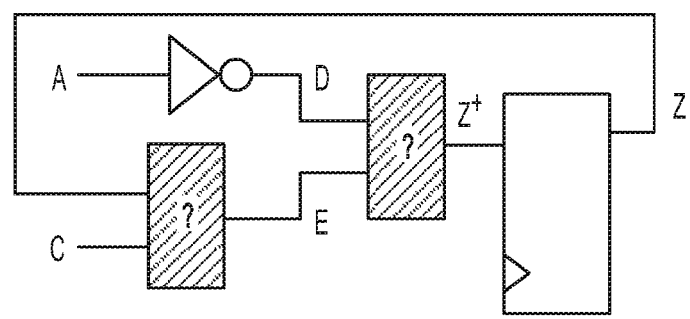
FIG. 7 is a diagram illustrating another example circuit.

The circuit 1 in FIG. 5 is a simple circuit consisting of three gates among which one gate is replaced with a reconfigurable unit. In this case, the untrusted foundry can apply all combinations at the inputs of missing unit and obtain the complete truth table of the missing unit and easily determine its functionality. Using the truth table in FIG. 10, the missing unit is a NOR gate. It would be more challenging if some inputs of a missing unit are supplied by some other missing units as shown in Circuit 2 in FIG. 6. Circuit 2 has two missing units where the one input of the second missing unit is provided by the output of the first missing unit. While the last column of Circuit 2's truth table in FIG. 11 presents the expected value and all input combinations are applied to the missing units' inputs, the internal signal E cannot be directly observed. The dependency between missing units may significantly increase efforts to determine the missing units. For small circuits, such as Circuit 2, as the size of truth tables is manageable, it is still possible to determine the missing units. By analyzing the truth table of Circuit 2 in FIG. 11, the first and second missing units are NAND and NOR gates, respectively. Circuit 3 in FIG. 7 shows a circuit with a feedback loop to its fan-in cone and two missing units located on one path. The circuit truth table in FIG. 12 shows that it may be difficult (e.g., or impossible) to infer the missing units due to incompleteness of truth table. When the signal D is 1, the output is 0. Its output still stays at 0 when the signal D is change to 0. The change of the signal C does not show any impact on the output signal $Z^+$. Therefore, it would be difficult (e.g., or impossible) to determine the missing units. The only way that remains for the untrusted foundry to determine the missing units is a brute-force attack where all combination of gates available in the target library is tried to find the one that gives the expected outputs.

To further rise the bar against the untrusted foundry, micro level (array) security can be used to develop a more complex procedure to implement an array of custom CMOS cells using one or more reconfigurable units. This approach would considerably increase efforts to determine the functionality of each reconfigurable unit as each implements a complex function, e.g., (A XOR B) AND C.

After manufacturing, a malicious party may perform reverse engineering to obtain detailed design implementation. The STT technology makes it possible to erase the content of reconfigurable units upon detecting any destructive attack. In addition, realizing the entire module, such as the AES cryptographic algorithm, with reconfigurable units hides detailed design implementation and render any side-channel attack ineffective.

(iv) Security Granularity: To further enhance design security at micro and macro levels, two alternative methods can be used: fixed and flexible reconfigurability (see FIG. 1).

Fixed reconfigurable fabric comprises reconfigurable units, however, some or all connections between the units are hardwired depending on the implementation of the IP. Flexible reconfigurability on the other hand also has configurable wiring resources through MTJ-configurable interconnect. If an algorithm is unknown to the attacker, it would be difficult (e.g., or impossible) to reconstruct the algorithm after all reconfigurable units are zerorised purely based upon the interconnect. However, if the algorithm is known to the attacker, but the implementation is not, this might not be sufficient. Hence, flexible reconfigurability may be used. Through the configurable wiring resources, the device may have similar security properties of an FPGA, e.g., a regular structure that is completely independent of the implemented algorithm. It should be noted that our goal is to provide sufficient flexibility such that it becomes infeasible for an attacker, even with resources of a nation state, to reverse engineer and therefore know the design that was implemented after all configurable information is deleted. Therefore, the trade-off between reconfigurability and security can be accounted for in device architecture. For example, the trade off can represented as the following: can we afford to have fixed wiring and to what extent?

In an aspect, the present methods and system comprise techniques to recover (e.g., or prevent the recover) of the contents of erased memory depending on memory type: SRAM, flip-flop, flash and STT memory. Especially the later is also may be important for the protection of hardware implementations using STT LUTs and MJT interconnect. The result can be measured in the number of bits recoverable based over time, e.g., the longer the recovery takes, the fewer bits can be recovered.

In an aspect, the present security-driven design method can significantly enhance design resiliency against variety of attacks during design development and design deployment. Judiciously replacing CMOS cells with STT reconfigurable units during design development hides design functionality and protects it from overproduction and cloning attacks. This effectively serves for IP protection as well, and no unauthorized party would be able to use a hard IP comprising reconfigurable units. The challenging counterfeiting issue can be effectively addressed if the content of reconfigurable units are simply erased before resigning the STT-CMOS based IC. In this way, any vendor would be able to isolate counterfeit ICs through performing a simple functional testing. The flow would also eliminate the need for split manufacturing in which manufacturing is divided into two parts and a trusted fab is required to finish up the manufacturing. After design release, the untrusted foundry may execute invasive or non-invasive reverse engineering attack to determine the functionality of reconfigurable units. However these efforts are fruitless as any destructive attack results in the erasure of content of reconfigurable units upon detecting an intrusion, and any side-channel attack is ineffective as detailed design implementation in not available to the attacker.

In an aspect, the present method and systems can comprise:
1. A design method for hybrid NVM/CMOS design partitioning with security, power, and performance objectives;
2. An algorithm that maximizes the security by deploying NVM-LUT logic under given power and performance constraints;
3. Design methodologies and guidelines for gate level, micro, and macro level hybridization of NVM and CMOS technologies and pertaining algorithms;

4. Design guidelines for use of fixed and programmable interconnects given the associate power/performance and security trade-off;
5. Design guidelines for choosing partial vs full reconfigurable NVM-LUTs considering power, performance and security trade-offs;
6. NVM-LUT implementations of reconfigurable logic gates (NAND, NOR, XOR, XNOR, AND, OR), arithmetic units (multiplier, divider, adder) and functional macro blocks (AES, SHA, blowfish, Rijndael);
7. Characterization tables of NVM-LUT power and performance for various logic gates;
8. Circuit solutions for low power and high performance implementation of NVM-LUT components;
9. Reliability analysis and enhancement solutions for NVM-LUT logic;
10. Evaluation of horizontal and perpendicular NVMs for NVM-logic applications and a design approach for hybrid use of both types of NVMs in a given design;

In an aspect, the present disclosure can be implemented as systems, methods, source codes, and scripts that enable application of the developed design methodologies on specific various security applications. As NVM is an evolving technology the design method described herein can change as the technology changes; however the methodology will remain the same.

Several of the figures mentioned above are now described in further detail. FIG. 1 illustrates an example process for designing a circuit. At block 102, an example circuit can be designed. The example circuit design can comprise various modules configured to perform a variety of functions. The example circuit design can comprise a processor 104. The processor 104 can comprise one or more functional units 106. The example circuit design can comprise an accelerator 108. The accelerator 108 comprise additional logical blocks configured to perform specific processing (e.g., faster the processor). The example circuit design can comprise a security block 110. The security block 110 can comprise a cryptographic engine, a cryptographic key, confidential IP (e.g., confidential circuitry), storage of classified data, and/or the like.

At block 112, the circuit design can be processed based on the present methods and systems to determine a circuit layout. For example, the circuit design can be processed by electronic design automation software. The electronic design automation software can be configured to select and place reconfigurable circuit elements as described herein. The electronic design automation software can use a hybrid design comprising custom CMOS cells and reconfigurable look-up-table (LUT) cells. Using reconfigurable LUT cells, reconfigurability can be implemented at the gate-level (e.g., NAND and NOR), micro-block level (e.g., Boolean expression: such as ((A and B) or C)), and/or macro-block level (e.g., multiplier, AES). Block 112 is shown in greater detail in FIG. 4, which is further described herein. At block 120, interconnects between a plurality of reconfigurable circuit elements are shown. Flexible (e.g., reconfigurable, programmable) interconnects can be used. Fixed (e.g., hard wired) interconnects can also be used.

At block 122, an example one of the plurality of reconfigurable circuit elements of block 120 is shown in greater detail. The example reconfigurable circuit element can be partially and/or fully reconfigurable. The example reconfigurable circuit element can comprise a look-up-table 124 (e.g., based on SST design). The LUT 124 can comprise a plurality of non-volatile memory cells (NVM) 126 (e.g., embedded non-volatile memory cell), such as magnetic tunnel junction (MTJ) cells 126. The plurality of NVMs 126 can be in parallel. The plurality of NVMs 126 can be electrically coupled to a selection tree 127 (e.g., CMOS selection tree). The selection tree 127 can be electrically coupled to a sense amplifier 128 (e.g., CMOS sense amplifier). A reconfigurable interconnect 130 is also shown. The reconfigurable interconnect 130 can comprise one or more non-volatile memory cells 133 (e.g., embedded non-volatile memory cell), such as an MTJ cells.

At block 132, an example one of the NVMs 126 is illustrated. The example NVM can comprise a MTJ cell. The MTJ cell can comprise two ferromagnetic layers 134 (e.g., two cylindrical layers below a bit line 136). The ferromagnetic layers 134 can be separated by an insulator 135. The ferromagnetic layers 134 can store information based on whether the ferromagnetic layers 134 are magnetized in parallel or anti-parallel. A word line 138 can be below the ferromagnetic layers 134. The word line 138 can couple ferromagnetic layers 134 to additional circuit elements such as a transistor 140 and a source line 142.

FIG. 3 is an example reconfigurable circuit element 300. The reconfigurable circuit element 300 can comprise a selection tree 302. The selection tree 302 can comprise a first stage of transistors (e.g., labeled as A and A'). The selection tree 302 can comprise a second stage of transistors (e.g., labeled as B and B'). The selection tree 302 can implement a combinational logic. The reconfigurable circuit element 300 can comprise a plurality of non-volatile memory cells (NVM) 304. The plurality of NVMs 304 can comprise magnetic tunneling junctions, flash memory cells, eFUSE memory, resistive random access memory (RRAM), ferroelectric random access memory (FERAM), a combination thereof, and/or the like. The plurality of NVMs 304 can be electrically coupled to the second stage of transistors. For example, each transistor of the second stage of transistors can be coupled to a corresponding NVM of the plurality of NVM 304. An example NVM is shown in FIG. 1. As an illustration, the reconfigurable circuit element can comprise a 2-input MTJ-based fully reconfigurable LUT. The LUT can comprise 4 MTJs and CMOS circuits needed for write, selection, and sensing MTJs.

The reconfigurable circuit element 300 can comprise a write circuit 306. The write circuit 306 can be electrically coupled between transistors of the second stage of selection tree 302 and the NVMs 304. The write circuit 306 can be configured to supply a current and/or voltage (e.g., from a first bit line 308 or source line) for altering the state (e.g., memory value, such as one or zero) of the NVMs. For example, the write circuit 306 can be configured to change the magnetic orientation (e.g., between parallel and anti-parallel) of the NVMs 304. The write circuit 306 can comprise a plurality of word lines configured to control corresponding transistors for each of the NVMs 304.

The reconfigurable circuit element 300 can comprise a current source 312, such as a dynamic current source. The reconfigurable circuit element 300 can comprise a reference tree 314. The reconfigurable circuit element 300 can comprise a load circuit 316, such as a precharge and active load circuit. The reconfigurable circuit element 300 can comprise a sense amplifier 318. The sense amplifier 318 can be electrically coupled to the load circuit 316. The sense amplifier 318 can be configured to amplify signals from the load circuit 316. The circuit 300 is just one example of a reconfigurable circuit element that can be used with the present methods and systems. Similar circuits can be used to implement vanishable logic (e.g., reconfigurable logic) of the present methods and systems. Aspects of the example circuit 300 (e.g., implemented using MTJs) are described in more detail in D. Suzuki et al., "Fabrication of a Nonvolatile Lookup-Table Circuit Chip Using Magneto/Semiconductor-Hybrid Structure for an Immediate-Power-Up Field Programmable Gate Array," IEEE 2009 Symposium on VLSI Circuits Digest of Technical Papers, vol. c-8, pp. 80-81 (2009), which is herein incorporated by reference in its entirety.

FIG. 4 is an example design method 400 for a circuit (e.g., integrated circuit). At block 402, a design process for implementing reconfigurable circuit elements can begin. The design process can receive constraints 404, such as parametric constraints (e.g., power constraints, performance constraints) and security constraints. Example constraints can comprise power constraints, performance constraints, max clock frequency, level of security. The design process can receive and/or access data from one or more technology libraries, such as a standard cell library 406. The technology libraries can define a variety of circuit elements, including basis circuit elements (e.g., resistors, transistors, diodes, capacitors), arrays, and more complex modules.

At block 408, partitions can be designed. Design units can be matched with circuit elements to perform the defined functions. One or more netlists can be analyzed. Circuit elements (e.g., CMOS parts) to be replaced with reconfigurable circuit elements can be identified (e.g., based on analysis of the netlist).

At block 408, it can be determined which of the design partitions are sensitive to security constraints and which are not. At block 408, the required security level for a partition can be determined. For example, the required security level can comprise gate level security, micro-level security, macro-level security, and/or the like.

At block 410, if gate level security is required for a partition, then candidate standard gates can be selected and replaced with reconfigurable cells. At block 412, if micro-level security is required for the partition, groups of standard gates can be selected and replaced with reconfigurable cells. At block 414, if macro-level security is required for the partition, selected modules can be implemented using reconfigurable cells.

At block 416, a determination can be made as to whether design constraints are met. For example, a determination can be made as to whether performance constraints, power constraints, and/or the like are satisfied. At block 420, if the design constraints are not met, then design constraints or selection criteria for replacing with reconfigurable circuit elements can be adjusted. For example, if the performance of the design is impacted by the reconfigurable gates, fewer gates on the design timing critical path can be selected to be replaced with reconfigurable circuit elements (e.g., STT design). At block 418, if the design constraints are met, then sign-off checks can be performed. If the sign-off checks are satisfied, the circuit (e.g., integrate circuit) can be fabricated. For example, data for fabricating the circuit can be transmitted to a device configured to fabricate the circuit.

Figure 13:
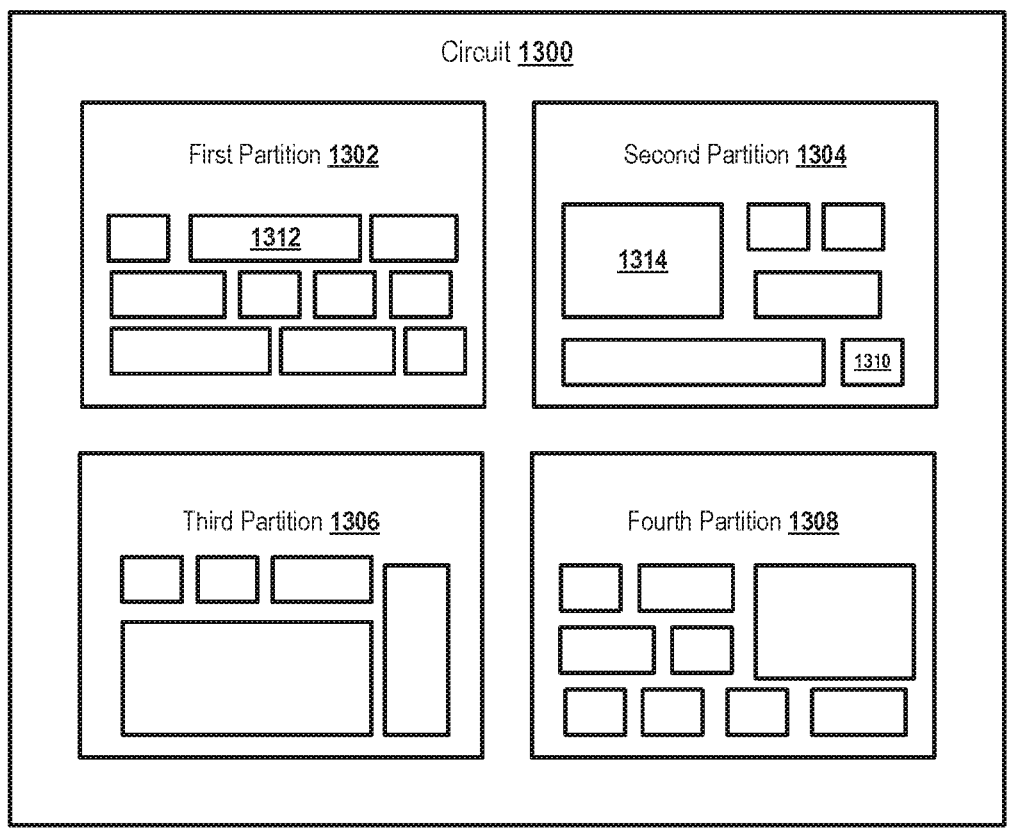
FIG. 13 is a block diagram illustrating an example layout of a circuit.

FIG. 13 is an example layout of a circuit 1300 (e.g., representing a plan for a circuit and/or an actually fabricated circuit). The circuit 1500 can comprise an integrated circuit (e.g., a circuit on a single chip, wafer, or die).

In an aspect, the circuit 1300 can comprise a plurality of partitions, such as a first partition 1302, a second partition 1304, a third partition 1306, and/or a fourth partition 1308. The plurality of partitions can comprise a variety of circuit elements, such as gates (e.g., logic gates), flip-flops, transistors, resistors, capacitors, processors, look-up-tables, and/or the like. The circuit elements can comprise individual circuit items (e.g., gates, transistors, resistors, magnetic tunnel junctions). The circuit elements can comprise micro-blocks (e.g., arrays, arithmetic units). The circuit elements can comprise macro-blocks. The micro-blocks can comprise multiple circuit items to implement a function. The macro-blocks can comprise multiple circuit items and/or micro-blocks to implement complex functioning (e.g., algorithms), such as encryption (e.g., AES, SHA, blowfish, Rijndael), decryption, encoding, decoding, and/or the like. The circuit items are illustrated as small blocks (e.g., first block 1310), the micro-blocks are illustrated as medium size blocks (e.g., second block 1312), and the macro-blocks are illustrated as large sized blocks (e.g., third block 1314) in FIG. 13.

In an aspect, the circuit 1300 can comprise one or more statically configured circuit elements. The statically configured circuit elements can be in a first portion of the circuit. The first portion of the circuit can comprise one of the plurality of partitions. The first portion of the circuit can comprise a portion of one of the plurality of partitions. The statically configured circuit elements can comprise any circuit item, circuit micro-block, circuit macro-block, a combination thereof, and/or the like that is hard wired (e.g., using an interconnect that is not designed to be reconfigured) into the circuit 1300. As an example, the statically configured circuit elements can comprise complementary metal-oxide-semiconductor (CMOS) circuit elements.

In an aspect, the circuit 1300 can comprise one or more reconfigurable circuit elements. The one or more reconfigurable circuit elements can be in a second portion of the circuit 1300. The one or more reconfigurable circuit elements can be configured to perform processing functions. Processing function can comprise any function other than storage, such as logic functions, arithmetic functions, encryption functions, encoding functions, counting functions, and/or the like. The second portion can be embedded (e.g., surrounded by) within the first portion. For example, the one or more reconfigurable circuit elements can be integrated with the one or more statically configured circuit elements (e.g., such that there are no direct input/output terminals for providing input values and/or measuring output values of the reconfigurable circuit elements)

The one or more reconfigurable circuit elements can comprise any circuit item, circuit micro-block, circuit macro-block, a combination thereof, and/or the like that can be reconfigured (e.g., by writing, re-writing, erasing). The reconfigurable circuit elements can comprise reconfigurable logic gates, reconfigurable arithmetic units, and/or reconfigurable macro blocks.

The one or more reconfigurable circuit elements can comprise a plurality of non-volatile memory cells. The non-volatile memory cells can be embedded non-volatile memory cells. For example, non-volatile memory cells can be integrated with (e.g., in a single partition) non-reconfigurable circuit elements, such as CMOS circuit elements. The non-volatile memory cells may not be directly accessible for probing (e.g., via input/output). The non-volatile memory cells can comprise magnetic tunneling junctions, flash memory cells, eFUSE memory cells, and/or the like. An example non-volatile memory cells (e.g., an MTJ) is shown in FIG. 1. The plurality of NVMs can comprise horizontal magnetic tunnel junctions, vertical magnetic tunnel junctions, a combination thereof, and/or the like.

The one or more reconfigurable circuit elements can be reconfigurable based on a security constraint. The security constraint can be a security constraint of a design specification for the circuit 1300. For example, the security constraint can comprise a security level. The security level can be associated with the functional design of a circuit element. The security level can comprise an element item (e.g., gate) security level indicating that the circuit element is specified to be configurable on the individual item level. The security level can comprise micro-block security level indicating that the circuit element is specified to be configurable on the micro-block level. The security level can comprise element item security level indicating that the circuit element is specified to be configurable on the macro-block level. The security level can comprise no security level. Such level can be associated with the statically configured circuit elements.

It should be noted that lower level reconfigurability (e.g., at the gate level as compared to the module level or array level), can be associated with higher security levels. Reconfigurability at the lowest level (e.g., gate level) makes it more difficult for an attacker to reverse engineer the design. The larger number of blocks (e.g., at gate level, more gates) that can be replaced with reconfigurable design, the more secure the resulting circuit.

The circuit 1300 can comprise a plurality (e.g., or at least one) of reconfigurable interconnects connecting one or more of the reconfigurable circuit elements, the statically configured circuit elements, or a combination thereof. An example reconfigurable interconnect can comprise one or more programmable elements and/or switching elements configured to switch from one path (e.g., hard wired interconnect) to another. The reconfigurable interconnect can comprise one or more non-volatile memory cells, such as one or more MTJs. The programmable element can be disposed at the intersection of one or more hard wired interconnects.

The reconfigurable circuit elements comprise a plurality (e.g., or at least one) of look-up-tables (LUTs). The plurality of LUTs can be optimized to prevent or prolong the LUT's functionality from being discovered by attacks. For example, the LUTs can be optimized such that the LUTs dissipate the same power consumption no matter what functionality is implemented (e.g., the same power for AND, OR, NAND, NOR and etc). This configuration can protect against side channel power attacks. In side channel power attacks, the attacker exploits the power variation across the design. By removing the power variation inside a LUT for various functionality implemented in a LUT, an attacker can be prevented from detecting the functionality implemented inside the LUT.

At least one of the plurality of LUTs can comprise a CMOS selection tree. The CMOS selection tree can be electrically coupled to a respective portion of the plurality of the MTJs. the CMOS selection tree can be electrically coupled to a CMOS sense amplifier configured to amplify an output from the CMOS selection tree. Example LUT's are illustrated and described further herein.

The circuit 1300 can comprise one or more intrusion circuit blocks configured to detect an attack on the reconfigurable circuit elements and erase the reconfigurable circuit elements in response to the attack. An attacker would be unable to identify the content of a LUT even if attacker has access to a programmed LUT (e.g., a LUT that has is not erased). Given the nature of reconfigurability in circuit design, the level of security can be enhance by implementing a hardware reverse engineering attempt detection circuits as the intrusion circuit blocks. The hardware reverse engineering attempt detection circuits can be any suitable hardware reverse engineering attempt detection circuits as understood by one of ordinary skill in the art. The intrusion circuit blocks can be configured erase the content of the LUT upon detecting a possible hardware reverse engineering attempt.

Figure 14:
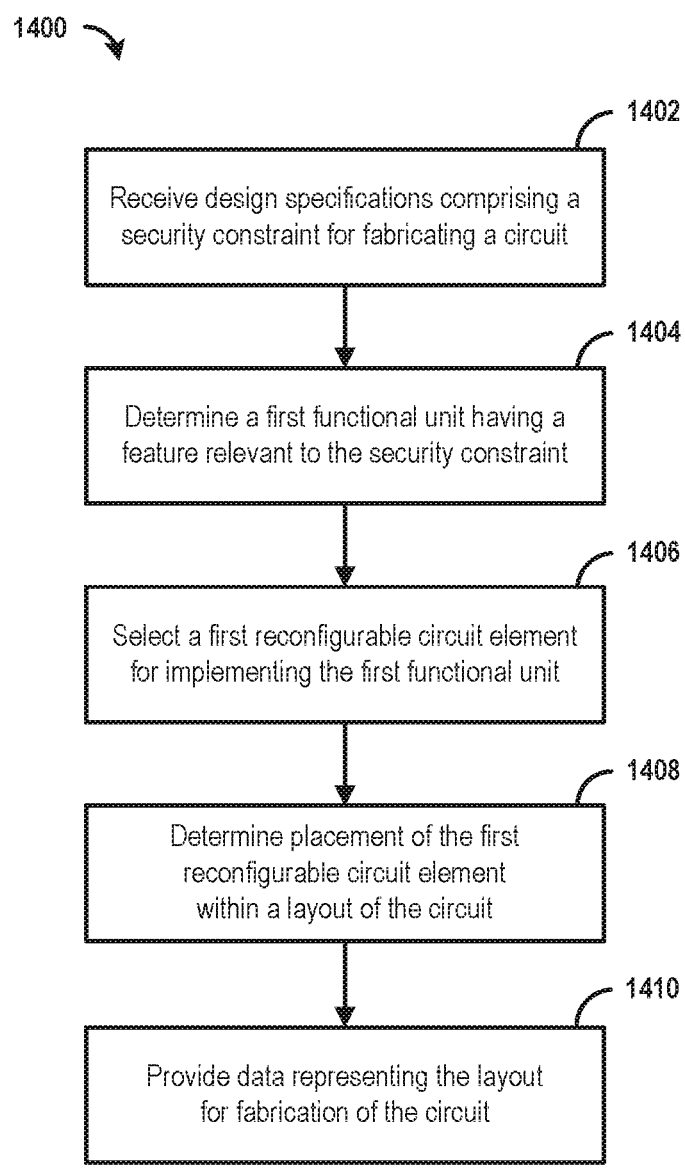
FIG. 14 is a flowchart illustrating an example method for designing a circuit.

FIG. 14 is an example method 1400 for designing a circuit in accordance with the present methods and systems. At step 1402, design specifications for fabricating a circuit can be determined (e.g., received). For example, the design specifications can be received from a file, from user input, from a software module, and/or the like. The design specifications and/or the circuit can comprise a plurality of functional units. For example, the functional units can be defined via a high-level specification (e.g., code specifying functional outcomes and constraints). The functional units can be defined via register transfer level hardware description language.

The design specifications can comprise one or more constraints, such as power constraints, timing constraints, layout constraints, and/or the like. The design specifications can comprise a security constraint. For example, one or more of the functional units can be associated with a corresponding security levels. As another example, the security levels can be associated with features that can be matched with features of the functional units. The security level can be associated with the functional design of a circuit element. The security level can comprise element item (e.g., gate) security level indicating that the circuit element is specified to be configurable on the individual item level. The security level can comprise micro-block security level indicating that the circuit element is specified to be configurable on the micro-block level. The security level can comprise element item security level indicating that the circuit element is specified to be configurable on the macro-block level. The security level can comprise no security level. Such level can be associated with the statically configured circuit elements.

At step 1404, a first functional unit of the plurality of functional units having a feature relevant to the security constraint can be determined. Determining the first functional unit of the plurality of functional units having a feature relevant to the security constraint can comprise determining a security level associated with the first functional unit.

At step 1406, a first reconfigurable circuit element for implementing the first functional unit can be selected. The first reconfigurable circuit element can comprise a plurality of non-volatile memory cells. The non-volatile memory cells can be embedded non-volatile memory cells. For example, non-volatile memory cells can be integrated with (e.g., in a single partition) non-reconfigurable circuit elements, such as CMOS circuit elements. The non-volatile memory cells may not be directly accessible for probing (e.g., via input/output of the first reconfigurable circuit element). The non-volatile memory cells can comprise magnetic tunneling junctions, flash memory cells, eFUSE memory cells, and/or the like.

The first reconfigurable circuit element can comprise a reconfigurable gate (e.g., or other basic circuit element), reconfigurable an array (e.g., multiple gates or other circuit elements) or other micro-block, and/or a module (e.g., comprising a plurality of gates/circuit elements). For example, selecting the reconfigurable circuit element for implementing the first functional unit can comprise determining, based on the security level, whether to implement the first functional unit as reconfigurable at the gate level, reconfigurable at the micro-block level, reconfigurable at the macro-block level, or a combination thereof.

At step 1408, placement of the first reconfigurable circuit element within a layout of the circuit can be determined. For example, the circuit can comprise an integrated circuit. The integrated circuit can be subdivided into a plurality of partitions. The first reconfigurable circuit element can be assigned to a place within one of the plurality of partitions. As mentioned previously, the first reconfigurable circuit element can be placed such that the first reconfigurable circuit element is embedded within a portion (e.g., partition) of the circuit have non-reconfigurable circuit elements.

In an aspect, a repetitive process can be performed until all of the plurality of function units are assigned to locations in the layout. One or more (or each) of the plurality of functional unites can be assessed for relevancy to the security constraint. For example, the method 1400 can further comprise determining a second functional unit of the plurality of functional units not having a feature relevant to the security constraint. A static circuit element for implementing the first functional unit. The static circuit element can comprise a CMOS circuit element. The method 1400 can further comprise determining a third functional unit of the plurality of functional units having a feature relevant to the security constraint. A second reconfigurable circuit element can be selected for implementing the second functional unit. The first reconfigurable circuit element can comprise a horizontal magnetic tunnel junction. The second reconfigurable circuit element can comprise a vertical magnetic tunnel junction. The repetitive process can be further performed for additional checking, modification of design and/or constraints, and/or the like (e.g., until all the constraints are met).

The method 1400 can further comprise determining to connect a reconfigurable interconnect to the first functional element based on the security constraint. The reconfigurable interconnect can comprise one or more non-volatile memory cells (NVM), such as magnetic tunneling junctions. The one or more NVMS can be configured to reconfigure connections between one or more circuit elements (e.g., when the orientation of the NVM is changed). The one or more NVMs can be disposed between multiple hard wired interconnects (e.g., wires, lines).

At step 1410, data representing the layout can be provided (e.g., sent, transmitted, displayed) for fabrication of the circuit. For example, the data can be saved in a file. The data can be transmitted to a device configured to print a mask (e.g., photolithography mask) or other device configured to fabricate the circuit. The circuit can then be fabricated based on data (e.g., the mask).

Figure 15:
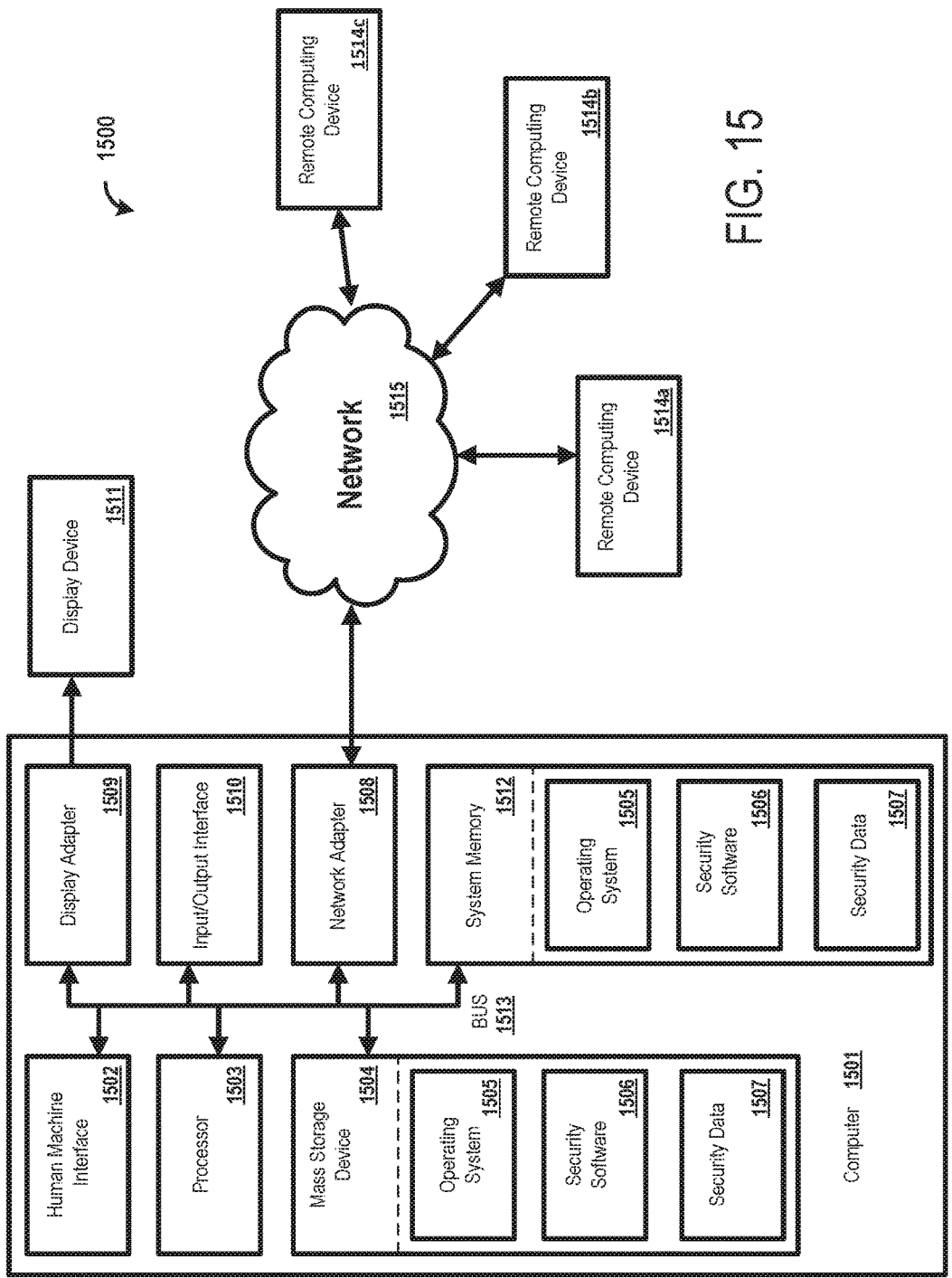
FIG. 15 is a block diagram illustrating an example computing device for implementing one or more aspects of the present disclosure.

In an exemplary aspect, the methods and systems can be implemented on a computer 1501 as illustrated in FIG. 15 and described below. Similarly, the methods and systems disclosed can utilize one or more computers to perform one or more functions in one or more locations. FIG. 15 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 1501. The components of the computer 1501 can comprise, but are not limited to, one or more processors 1503, a system memory 1512, and a system bus 1513 that couples various system components including the one or more processors 1503 to the system memory 1512. The system can utilize parallel computing.

The system bus 1513 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 1513, and all buses specified in this description can also be implemented over a wired or wireless network connection and each of the subsystems, including the one or more processors 1503, a mass storage device 1504, an operating system 1505, security software 1506, security data 1507, a network adapter 1508, the system memory 1512, an Input/Output Interface 1510, a display adapter 1509, a display device 1511, and a human machine interface 1502, can be contained within one or more remote computing devices 1514a,b,c at physically separate locations, connected through buses of this form, in effect implementing a fully distributed system.

The computer 1501 typically comprises a variety of computer readable media. Exemplary readable media can be any available media that is accessible by the computer 1501 and comprises, for example and not meant to be limiting, both volatile and non-volatile media, removable and non-removable media. The system memory 1512 comprises computer readable media in the form of volatile memory, such as random access memory (RAM), and/or non-volatile memory, such as read only memory (ROM). The system memory 1512 typically contains data such as the security data 1507 and/or program modules such as the operating system 1505 and the security software 1506 that are immediately accessible to and/or are presently operated on by the one or more processors 1503.

In another aspect, the computer 1501 can also comprise other removable/non-removable, volatile/non-volatile computer storage media. By way of example, FIG. 15 illustrates the mass storage device 1504 which can provide non-volatile storage of computer code, computer readable instructions, data structures, program modules, and other data for the computer 1501. For example and not meant to be limiting, the mass storage device 1504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1504, including by way of example, the operating system 1505 and the security software 1506. Each of the operating system 1505 and the security software 1506 (or some combination thereof) can comprise elements of the programming and the security software 1506. The security data 1507 can also be stored on the mass storage device 1504. The security data 1507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 1501 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 1503 via the human machine interface 1502 that is coupled to the system bus 1513, but can be connected by other interface and bus structures, such as a parallel port, game port, an IEEE 1394 Port (also known as a Firewire port), a serial port, or a universal serial bus (USB).

In yet another aspect, the display device 1511 can also be connected to the system bus 1513 via an interface, such as the display adapter 1509. It is contemplated that the computer 1501 can have more than one display adapter 1509 and the computer 1501 can have more than one display device 1511. For example, the display device 1511 can be a monitor, an LCD (Liquid Crystal Display), or a projector. In addition to the display device 1511, other output peripheral devices can comprise components such as speakers (not shown) and a printer (not shown) which can be connected to the computer 1501 via the Input/Output Interface 1510. Any step and/or result of the methods can be output in any form to an output device. Such output can be any form of visual representation, including, but not limited to, textual, graphical, animation, audio, tactile, and the like. The display device 1511 and computer 1501 can be part of one device, or separate devices.

The computer 1501 can operate in a networked environment using logical connections to one or more remote computing devices 1514a,b,c. By way of example, a remote computing device can be a personal computer, portable computer, smartphone, a server, a router, a network computer, a peer device or other common network node, and so on. Logical connections between the computer 1501 and a remote computing device 1514a,b,c can be made via a network 1515, such as a local area network (LAN) and/or a general wide area network (WAN). Such network connections can be through the network adapter 1508. The network adapter 1508 can be implemented in both wired and wireless environments. Such networking environments are conventional and commonplace in dwellings, offices, enterprise-wide computer networks, intranets, and the Internet.

For purposes of illustration, application programs and other executable program components such as the operating system 1505 are illustrated herein as discrete blocks, although it is recognized that such programs and components reside at various times in different storage components of the computing device 1501, and are executed by the one or more processors 1503 of the computer. An implementation of the security software 1506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
receiving design specifications for fabricating a circuit comprising a plurality of functional units, wherein the design specifications comprise a security constraint;
determining, based on the security constraint, a first functional unit of the plurality of functional units, wherein the first functional unit comprises a feature relevant to the security constraint;
selecting a first reconfigurable circuit element for implementing the first functional unit, wherein the first reconfigurable circuit element comprises:
a selection tree, wherein the selection tree comprises one or more complementary metal oxide-semiconductor cells;
a sense amplifier, wherein the sense amplifier comprises one or more complementary metal oxide-semiconductor cells;
one or more non-volatile memory cells, wherein the one or more non-volatile memory cells comprise one or more magnetic tunneling junction cells, wherein the one or more magnetic tunneling junction cells comprise two ferromagnetic layers separated by an insulator and magnetized in parallel or anti-parallel, wherein the magnetic tunneling junction cells are changed by a torque of spin-polarized current; and
one or more reconfigurable interconnects, wherein the reconfigurable interconnects comprise one or more magnetic tunneling junction cells, wherein the magnetic tunneling junction cells each comprise two ferromagnetic layers separated by an insulator and magnetized in parallel or anti-parallel, wherein the magnetic tunneling junction cells are changed by a torque of spin-polarized current, wherein the selection tree, the sense amplifier, the non-volatile memory cells, and the reconfigurable interconnects are electrically coupled, wherein the reconfigurable circuit element is reconfigurable at a gate-level;
determining placement of the first reconfigurable circuit element within a layout of the circuit; and
providing, for fabrication of the circuit, data representing the layout.

2. The method of claim 1, further comprising:
determining a second functional unit of the plurality of functional units, wherein the second functional unit does not comprise a feature relevant to the security constraint; and
selecting a static circuit element for implementing the first functional unit, wherein the static circuit element comprises a CMOS circuit element.

3. The method of claim 1, wherein determining the first functional unit comprises determining a security level associated with the first functional unit.

4. The method of claim 3, wherein selecting the first reconfigurable circuit element for implementing the first functional unit comprises determining, based on the security level, whether to implement the first functional unit as one or more of reconfigurable at the gate level, reconfigurable at the micro-block level, or reconfigurable at the macro-block level.

5. The method of claim 1, further comprising determining, based on the security constraint, to connect a reconfigurable interconnect to the first functional unit.

6. The method of claim 5, wherein the reconfigurable interconnect comprises a magnetic tunneling junction for reconfiguring the reconfigurable interconnect.

7. The method of claim 1, further comprising:
determining a second functional unit of the plurality of functional units, wherein the second functional unit comprises a feature relevant to the security constraint; and
selecting a second reconfigurable circuit element for implementing the second functional unit, wherein the first reconfigurable circuit element comprises a horizontal magnetic tunnel junction and the second reconfigurable circuit element comprises a vertical magnetic tunnel junction.

8. The method of claim 1, wherein the first reconfigurable circuit element comprises a look-up-table (LUT).

9. The method of claim 8, wherein the LUT comprises a CMOS selection tree electrically coupled to the plurality of non-volatile memory cells, and wherein the CMOS selection tree is electrically coupled to a CMOS sense amplifier configured to amplify an output from the CMOS selection tree.

10. A reconfigurable circuit element, comprising:
a selection tree, wherein the selection tree comprises one or more complementary metal oxide-semiconductor cells;
a sense amplifier, wherein the sense amplifier comprises one or more complementary metal oxide-semiconductor cells;
one or more non-volatile memory cells, wherein the one or more non-volatile memory cells comprise one or more magnetic tunneling junction cells, wherein the one or more magnetic tunneling junction cells comprise two ferromagnetic layers separated by an insulator and magnetized in parallel or anti-parallel, wherein the magnetic tunneling junction cells are changed by a torque of spin-polarized current and
one or more reconfigurable interconnects, wherein the reconfigurable interconnects comprise one or more magnetic tunneling junction cells, wherein the magnetic tunneling junction cells each comprise two ferromagnetic layers separated by an insulator and magnetized in parallel or anti-parallel, wherein the magnetic tunneling junction cells are changed by a torque of spin-polarized current, wherein the selection tree, the sense amplifier, the non-volatile memory cells, and the reconfigurable interconnects are electrically coupled, wherein the reconfigurable circuit element is reconfigurable at a gate-level.

11. The reconfigurable circuit element of claim 10, further comprising one or more reconfigurable circuit elements each comprising one or more of reconfigurable logic gates, reconfigurable arithmetic units, or reconfigurable macro blocks.

12. The reconfigurable circuit element of claim 10, further comprising predefined circuit elements comprising CMOS circuit elements.

13. The reconfigurable circuit element of claim 10, further comprising one or more intrusion circuit blocks configured to:
detect an attack on the reconfigurable circuit elements; and
erase, based on the attack, the reconfigurable circuit elements.

14. The reconfigurable circuit element of claim 10, wherein the one or more non-volatile memory cells each comprise horizontal magnetic tunnel junctions and vertical magnetic tunnel junctions.

15. The reconfigurable circuit element of claim 10, further comprising a plurality of reconfigurable interconnects connecting one or more of the reconfigurable circuit elements or the predefined circuit elements.

16. The reconfigurable circuit element of claim 11, wherein the reconfigurable circuit elements comprise a plurality of look-up-tables (LUTs).

17. The reconfigurable circuit element of claim 16, wherein each of the plurality of LUTs are optimized to prevent or prolong the LUT's functionality from being discovered by attacks.

18. The reconfigurable circuit element of claim 16, wherein at least one of the plurality of LUTs comprises a CMOS selection tree electrically coupled to a respective portion of the plurality of the non-volatile memory cells.

19. The reconfigurable circuit element of claim 18, wherein the CMOS selection tree is electrically coupled to a CMOS sense amplifier configured to amplify an output from the CMOS selection tree.

20. A reconfigurable circuit element comprising:
a sense amplifier;
a load circuit, wherein the load circuit comprises a pre-charge and an active load circuit;
   wherein the load circuit is electrically coupled to the sense amplifier;
a selection tree, wherein the selection tree comprises a first stage of transistors and a second stage of transistors, wherein the first stage of transistors and the second stage of transistor of the selection tree are electrically coupled, wherein the selection tree is electrically coupled to the load circuit;
a plurality of non-volatile memory cells, wherein the plurality of non-volatile memory cells comprise magnetic tunneling junction cells, wherein the magnetic tunneling junction cells comprise two ferromagnetic layers separated by an insulator and magnetized in parallel or anti-parallel, wherein the magnetic tunneling junction cells are changed by a torque of spin-polarized current, wherein the plurality of magnetic tunneling junction cells are electrically coupled to the second stage of transistors, wherein the selection tree is electrically coupled to the load circuit;
a reference tree, wherein the reference tree comprises a first stage of transistors and a second stage of transistors, wherein the first stage of transistors and the second stage of transistors of the reference tree are electrically coupled, wherein the reference tree is electrically coupled to the load circuit;
a write circuit, wherein the write circuit is electrically coupled between the second stage of transistors of the selection tree and the plurality of non-volatile memory cells, wherein the write circuit is configured to supply a current or voltage for altering the state of the selection tree, wherein the write circuit can be configured to change the magnetic orientation of the selection tree, wherein the write circuit can comprise a plurality of word lines configured to control corresponding transistors for each of the non-volatile memory cells; and
a current source, wherein the reconfigurable circuit element is reconfigurable at a gate-level.

* * * * *